United States Patent [19]
Iji et al.

[11] Patent Number: 5,624,550
[45] Date of Patent: Apr. 29, 1997

[54] PROCESS FOR TREATING SLUDGE AND SYSTEM FOR THE SAME

[75] Inventors: Masahiro Iji, Chiba-ken; Masami Yoda, Kanagawa-ken; Shin Suzuki, Tokyo; Kaoru Ishizuka, Tokyo; Sotoo Kubo, Tokyo; Isao Yamaki, Tokyo; Toshikuni Hashimoto, Saitama-ken, all of Japan

[73] Assignees: Chemical Grouting Co., Ltd.; Front Engineering Co., Ltd.; Kurita Water Industries Ltd.; Shoeisangyo Corporation, all of Tokyo, Japan

[21] Appl. No.: 513,736

[22] Filed: Aug. 10, 1995

Related U.S. Application Data

[62] Division of Ser. No. 104,850, Aug. 12, 1993, Pat. No. 5,462,672.

[30] Foreign Application Priority Data

Aug. 13, 1992 [JP] Japan .................... 4-215907

[51] Int. Cl.⁶ .................................................. C02F 11/14
[52] U.S. Cl. .................... 210/104; 210/143; 210/198.1; 210/205; 210/206
[58] Field of Search ........................... 210/104, 105, 210/143, 198.1, 205, 206

[56] References Cited

U.S. PATENT DOCUMENTS

| | | | |
|---|---|---|---|
| 4,273,658 | 6/1981 | Karman | 210/740 |
| 4,336,143 | 6/1982 | Abbott | 210/740 |
| 4,439,325 | 3/1984 | Blais | 210/740 |
| 5,034,137 | 7/1991 | Okamoto et al. | 210/727 |
| 5,093,008 | 3/1992 | Clifford, III | 210/727 |
| 5,250,189 | 10/1993 | Rey | 210/712 |

FOREIGN PATENT DOCUMENTS

| | | |
|---|---|---|
| 4100255 | 7/1991 | Germany . |
| 37580 | 4/1978 | Japan . |
| 231999 | 9/1989 | Japan . |
| 1400641 | 6/1988 | U.S.S.R. . |

*Primary Examiner*—Neil McCarthy
*Attorney, Agent, or Firm*—Lowe, Price, LeBlanc & Becker

[57] ABSTRACT

Sludge which is supplied from an untreated sludge tank 3 and diluting water from a diluting water supply facility 14 is charged into a continuous kneading mixer 12 for diluting the sludge to make the specific weight of the sludge 1.15 to 1.35. The diluted sludge is supplied to a dehydrating machine 25 in accordance with the capacity of the used dehydrating machine 25. The diluted sludge is firstly added with an inorganic flocculating agent G and is mixed in a first blender 24A and is then added with a high molecular flocculating agent G2 and is mixed in a second blender 24B. Thereafter, the sludge is supplied to a belt press dehydrating machine 25 in which it is subjected to a dehydrating treatment.

2 Claims, 15 Drawing Sheets

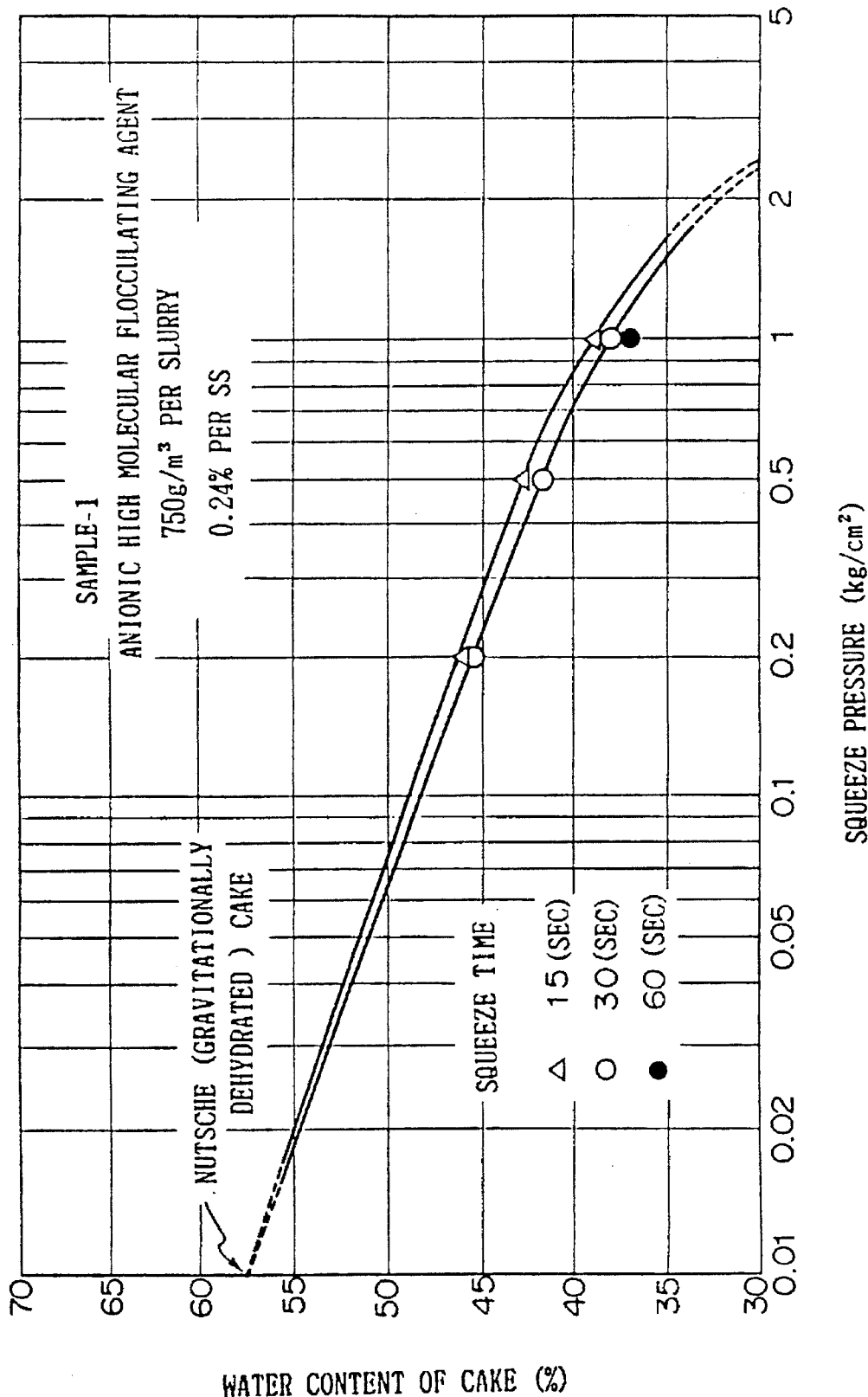

F I G. 1 0
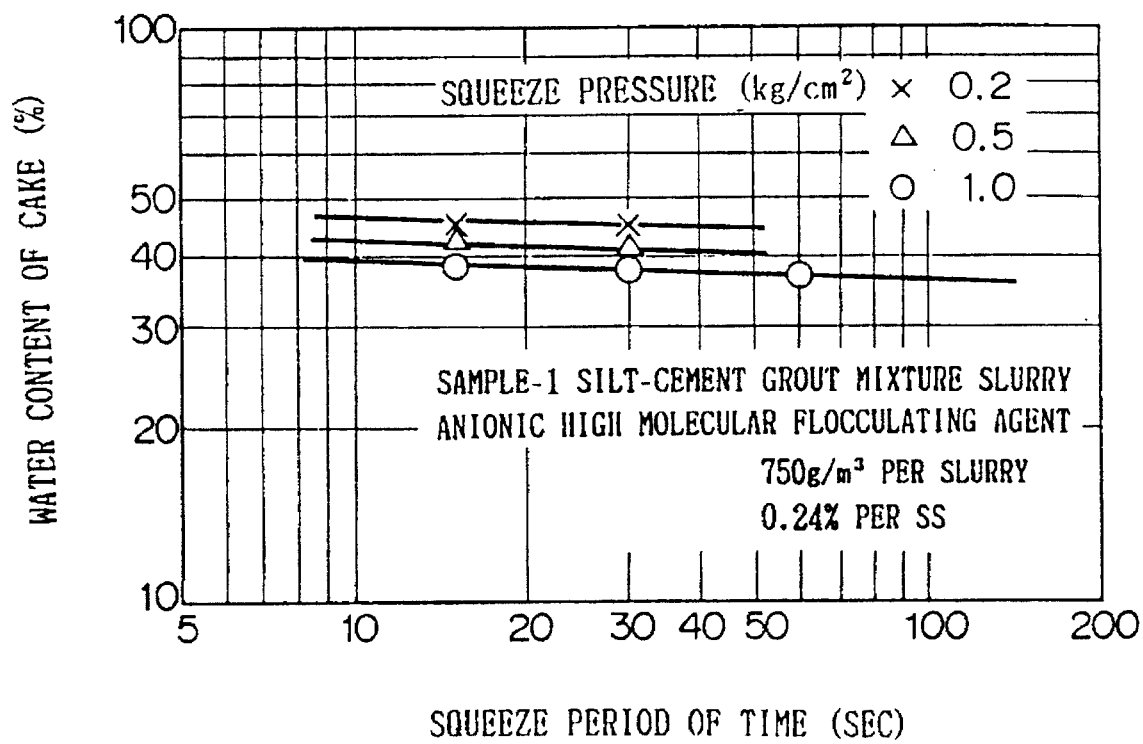

PROCESS FOR TREATING SLUDGE AND SYSTEM FOR THE SAME

This application is a division of application Ser. No. 08/104,850 filed Aug. 12, 1993 now U.S. Pat. No. 5,462,672.

BACKGROUND OF THE INVENTION (a) Field of the Invention

The present invention relates to a process for stably treating sludge which is generated from a ground improving working site and a system for the same.

(b) Description of the Related Art

Sludge such as cement or bentonite sludge which is discharged from a ground improvement working site contains much cement. Accordingly, it is necessary to treat the sludge as industrial waste. In a construction site where wide yards can be provided, a pit which will contain the sludge is bored and the sludge is sun-dried and is transported. In practice, it is difficult to provide a wide drying yard. Most of the generated sludge (more than 90%) is transported to a final treating site by a vacuum car or sludge transporting dump car without any treatment and is processed, for example, by sun drying by specialists.

On the other hand, in usual dam sites or slurry shield boring sites, the sludge treatment is conducted by preliminarily removing suspended materials having large grain sizes and high specific weights from the slurry in a sand sedimentation pond or by means of liquid cyclone or mud screen and then by flocculating finer particles which have passed the screen with a flocculant. The flocculated and sedimented sludge contains much water and thus can not be transported by a dump car or can not be buried for disposal. Accordingly, the sludge is dehydrated by sun-drying or by means of dehydrating machine and thereafter transported for disposal.

If supernatant water in which suspended material is flocculated and sedimented has a ph which falls with a range of regulation (usually less than 5.8 and higher than 8.6), it is pH adjusted with a neutralizing agent and then discharged or reused.

The dehydrating treatment may include vacuum dehydration by means of belt filter, oliver filter and the like; centrifugal dehydration by means of centrifugal dehydrating machine; pressurizing dehydration by means of filter press, belt press and the like; granulation dehydration by means of granulation dehydrating machine. Many filter presses having a high dehydrating capacity are used because the size of the machine is small and is easy to handle and to transport.

It has become more difficult to provide disposal sites for industrial waste, since they have to be provided in more remote area's in order to avoid pollution problems. The sludge generated from a ground improvement working should be reduced in volume by flocculation and dehydration in order to reduce cost. The sludge generated by jetting and agitating, such as the so called C-JG (column jet) method, JSG method, etc. among various ground improvement working methods, contains much cement or bentonite, and has a relatively high specific weight due to mixing with fine soil particles in association with jetting and agitation, such as a specific weight of about 1.35 to 1.50 as shown in FIGS. 14 and 15. (FIGS. 14 and 15 show the specific weight of cohesive and sand soils respectively) and may have $\gamma=1.60$ for specific soil species, such sludge exhibits a number of problems in sludge treatment.

Disposal of the sludge is regulated so that the disposed sludge has a water content of 85% or less. If dehydrated cakes have a water content of about 50% or more, on transportation by dump cars, the cakes readily become slurry for an extended period of transportation.

Unless the dehydrated cakes have a water content less than the above mentioned value, transportation is difficult. A stable dehydrating capacity is one of the most essential requirements for the sludge treatment.

However, even if the cement or bentonite sludge which is generated from a ground improvement working site is continuously treated by adding a flocculant and by dehydrating it by means of a dehydrating machine, clogging of filter fabric which is used in a filter press or belt press may occur due to the fact that the untreated sludge has relatively high varying specific weight and that an insufficient or excessive amount of flocculant may be added. This invites lowering the treating capacity.

Conventional sludge treatment is carried out by means of a sludge treating machine installed in the site and manually operated. Operation and maintenance cost is very high. Automation of the treatment and reduction in the operating cost by reduction in volume of sludge are desired.

SUMMARY OF THE INVENTION

It is, therefore, a main object of the present invention to provide a process and system for treating sludge which automatically supplies the sludge having a given specific weight according to the capacity of a dehydrating machine even if there are variations in the specific weight of untreated sludge and which provides a stable dehydrating capacity for an extended period of time by addition of an appropriate amount of the flocculant and reduces the cost by increasing the efficiency of operation and decreasing the volume of the sludge.

In order to accomplish the above mentioned object of the present invention, there is provided a process for treating sludge comprising the steps of diluting sludge generated from a ground improvement working site with water based upon the measured specific weight of the untreated sludge so that the specific weight of the diluted sludge falls in the range of 1.15 to 1.35, flocculating the diluted sludge by adding a flocculating agent, and dehydrating the sludge by means of mechanical dehydrating machine. The amount of the flocculating agent to be added is controlled in accordance with a predetermined relation between the specific weight and the amount of the flocculating agent to be added.

A system for treating sludge of the present invention comprises an untreated sludge container for containing sludge which is generated from a ground improvement working site, means for supplying water for diluting the sludge, means for admitting the sludge from said container and the diluting water from diluting water supplying means to dilute the sludge and to supply said diluted sludge to dehydrating means according to the capacity thereof, means for adding a flocculating agent to the diluted sludge supplied to said dehydrating means, means for mechanically dehydrating diluted sludge containing the flocculating agent, means for controlling the amounts of the sludge and the diluting water to be supplied to said sludge diluting means so that the diluted sludge has a specific weight of 1.15 to 1.35, and means for controlling the amount of the flocculating agent to be added to the diluted sludge.

In accordance with the present invention, the specific weight of the sludge to be treated is adjusted to fall in the range of 1.15 to 1.35 in a preliminary treatment stage prior to flocculating and dehydrating stages. Accordingly, clogging of the filter fabric is suppressed at the subsequent dehydrating step. The most efficient and stable dehydrating performance of the dehydrating machine can be assured for an extended period of time. Insufficient addition of the flocculant provides incomplete formation of floc, resulting in deposition of unflocculated sludge on the filter fabric on squeezing. Excessive addition of flocculant provides formation of cohesive floc and results in deposition of excessive flocculant on the filter fabric causing the filter fabric to clog. Operation of the dehydrating machine may be interrupted. In contrast, a stable dehydration performance can be assured for an extended period of time by controlling the amount of flocculant to be added according to a predetermined relation between the specific weight of the sludge and the amount of the flocculant to be added.

The above mentioned adjustment of the specific weight of the sludge is preferably carried out based upon the density of the sludge which is supplied to a continuous mixer. The sludge can be quickly supplied to the dehydrating machine according to the dehydrating capacity thereof, resulting an increase in efficiency of operation.

BRIEF DESCRIPTION OF THE DRAWINGS

FIG. 9 is a graph showing the squeeze pressure and the water content of the cake in Example 3;

FIG. 10 is a graph showing the relation between the squeeze period of time and the water content of the cake in Example 3;

DESCRIPTION OF THE PREFERRED EMBODIMENT

Now, the present invention will be described in more detail by way of an embodiment with reference to drawings.

Figure 1:
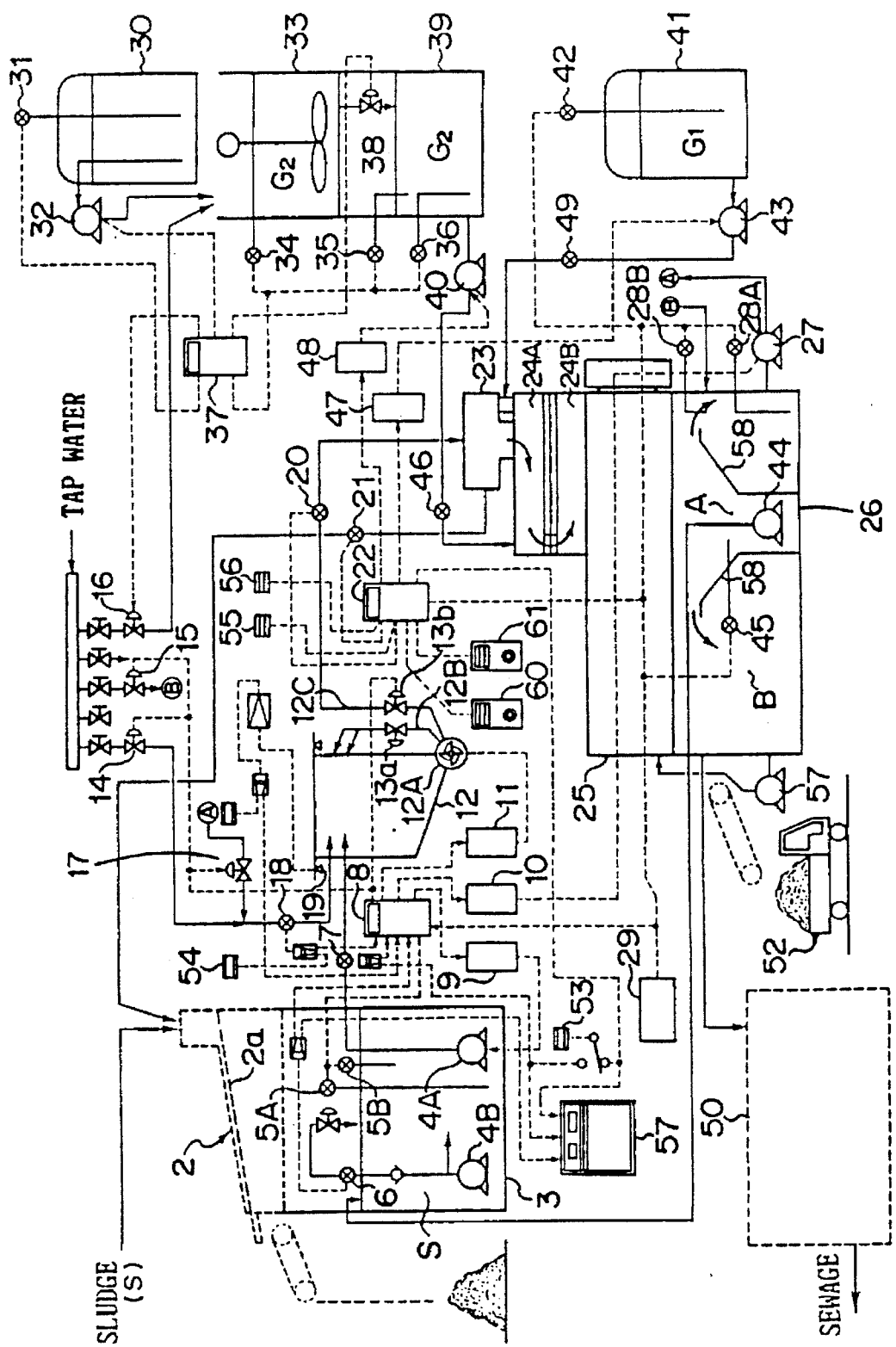
FIG. 1 is a block diagram of a sludge treating system of the present invention.

Referring now to FIG. 1, untreated sludge S, such as slime generated by a ground improving method using jetting and agitating method, such as C-JG or JSG method is initially subjected to grain size classification by means of mud screen 2. Sands and gravel having a grain size larger than 2 mm are removed from the sludge to be treated by means of screen 2a. The sludge which has passed through the screen 2a is temporarily reserved in an untreated sludge tank 3

Level gauges 5A and 5B, feed pumps 4A and 4B and a specific weight meter 6 are disposed within the untreated sludge tank 3. The measurements of these measuring devices are fed to a control unit 8.

Figure 14:
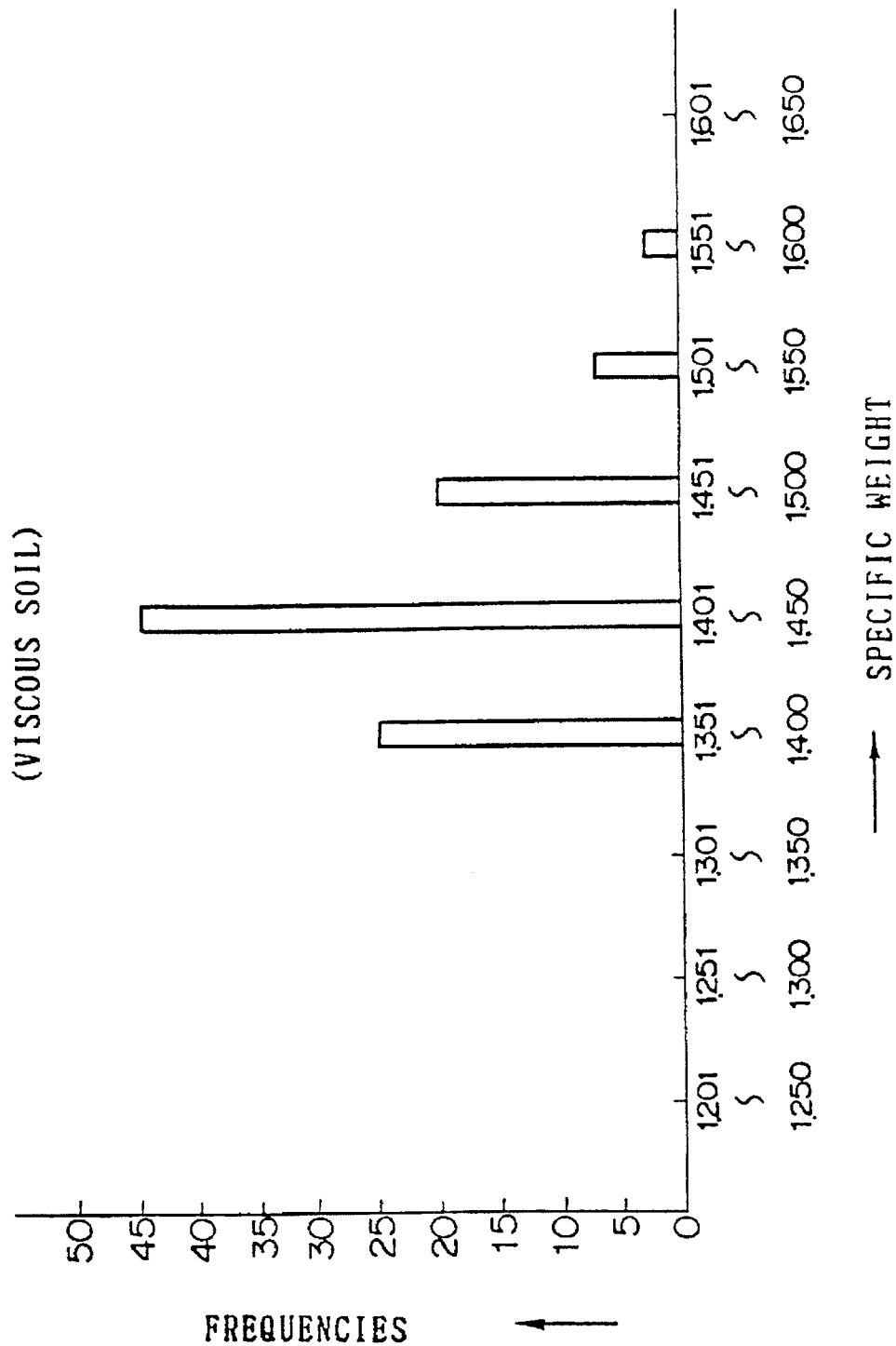
FIG. 14 is a graph showing the distribution of the specific weight of the sludge in case of cohesive soil.
Figure 15:
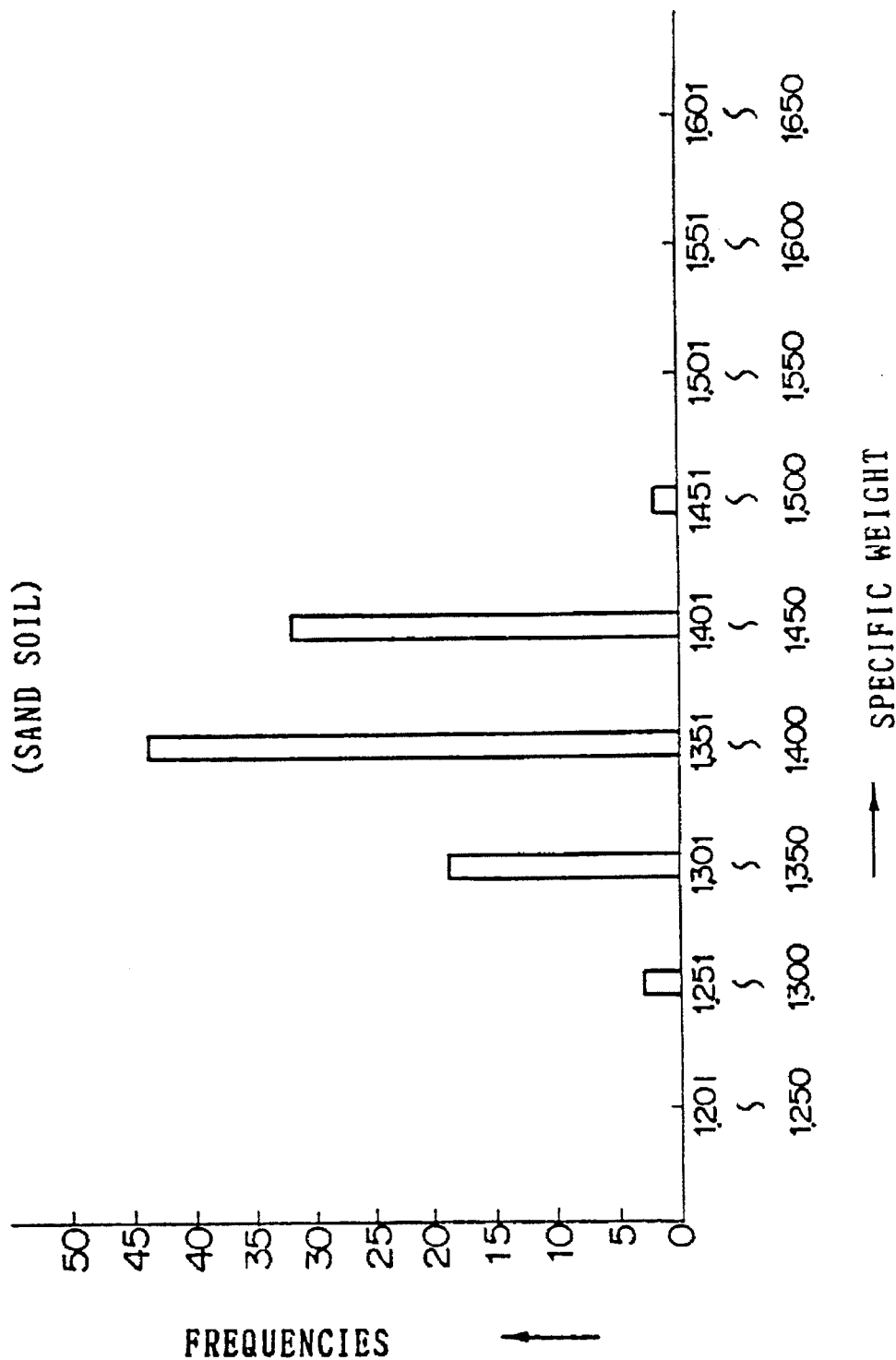
FIG. 15 is a graph showing the distribution of the specific weight of the sludge in case of sand soil.

The specific weight of the untreated sludge S usually ranges from 1.35 to 1.50 as shown in FIGS. 14 and 15 and may assume about 1.6 depending upon the sort of the ground. The untreated sludge may cause clogging in subsequent dehydration treatment, resulting in an interruption of the operation.

In order to prevent this, the specific weight of the sludge is adjusted so that it is within the range of 1.15 to 1.35 by adding the sludge with water based upon the data shown in the graph of the sludge specific weight distribution and the amount of flocculating agent (flocculant) is controlled to an optimum value depending upon the specific weight of the sludge.

Accordingly, the feed pump 4 is driven in accordance with an instruction from the control unit 8 for feeding the sludge in the tank S to a continuous kneading mixer 12. The amount of the sludge to be added to the mixer 12 is measured by a load cell 19 and the amount of the supplied sludge is measured by a flow meter 7. The amount of the sludge supplied to the mixer 12 is controlled in such a manner that the sludge will not overflow the mixer 12. The feed pump 4B is adapted to circulate the sludge through a density meter 6 disposed within the untreated sludge tank 3 and to perform agitation of the reserved sludge by jetting some of the fed sludge into the tank 3. The level of the sludge in the tank 3 is measured by the level gauges 5A and 5B. A signal representative of the level is fed to the control unit 8 to control the level. Reference numerals 9 to 11 denote inverters for controlling the pumps; 57 denotes a 2-pen recorder; 54 an indicator of the flow meter 7.

Supply of diluting water to the continuous kneading mixer 12 is controlled by the control unit 8 based upon the result of the measuring of the specific weight of the sludge in the tank 3 so that the specific weight of the treated sludge falls within the range of 1.15 to 1.35 (preferably within the range of 1.20 to 1.33 if transportability of the sludge in sludge treatment line, mixing ability with flocculating agent and efficiency of dehydration, etc. are considered as important factors). Since presetting of an excessively high dilution ratio may invite a decrease in treatment efficiency, it is necessary to confirm the specific weight of the untreated sludge and to determine a preferable dilution ratio by considering all conditions depending upon the confirmed specific weight.

Supply of the dilution water is controlled by a flow regulating valve provided for the mixer 12 in accordance with an instruction from the control unit 8 at the beginning of the treatment. After a given amount of water has been supplied to the mixer 12, in normal operation, diluting water is supplied from a separated water tank 26 in which water which is separated from a dehydrating machine is reserved. Control of the optimum amount of of dilution water to be added on normal operation is conducted by means of flow regulating valve 17 in response to a flow signal from a flow meter 18 disposed along the length of a supply line.

In order to adjust the specific weight, the amount of diluting water may be changed relative to the supplied sludge and vice versa. Supply of diluting water and sludge may be conducted continuously or discontinuously.

The sludge and the diluting water is charged into the continuous kneading mixer 12 and mixed and kneaded with each other by the above mentioned method. Now, the continuous kneading mixer 12 will be described in detail. The mixer 12 includes a disc casing 12A which is communicated with the inside of the mixer at the lower portion thereof, a rotary disc in the inside of the disc casing 12A, a return pipe 12A and a discharge pipe 12C, and operation valves 13a and 13b which are provided in the return pipe 12A and the discharge pipe 12C, respectively. If the operation is conducted while the operation valve 13b is closed and the operation valve 13a is opened, the sludge in the mixer 12 is continuously circulated via the return pipe 12B so that it is agitated and mixed and a given amount of sludge can continuously or discontinuously be fed from the discharge pipe 12C. A specific weight meter may be provided at the exit of the mixer 12 if necessary.

The sludge pumped via the discharge pipe 12C is supplied to a next dehydrating treatment stage. The amount of the supplied sludge is measured by a flow meter 20 provided on the intermediate position of the discharge pipe 12C. The pumped sludge is supplied to a continuous dehydrating machine such as a belt press 25 after passing through a metering tank 23, a first blender 24A and a second blender which promote flocculation. Some of the sludge supplied from the mixer 12 is fed to the belt press 25 at a given supply amount per unit time and excess sludge is returned to the mud screen 2 from the metering tank 12 under control of a controller 22. The amount of the returned sludge is measured by the flow meter 21. The difference between the amount of the returned sludge and the amount of the sludge measured by the flow meter 20 disposed in the main supply line is recorded on a three-pen recorder 57 and displayed on a display 53 as the amount of the sludge supplied to the belt press 25.

The sludge is added at the entrance of the upstream first blender 24A with an inorganic flocculating agent G1 supplied from an inorganic flocculating tank 41 and they are mixed with each other in the first blender 24A and the mixture is added with an anionic high molecular flocculating agent G2 at the entrance of the second blender 24B and is mixed therein and the mixture is then supplied to the belt press 25.

The inorganic flocculating agent G1 is reserved in the inorganic flocculation tank 41 and the residual amount thereof is monitored by a level gauge 42. The agent G1 is continuously fed to the entrance of the first blender 24A by means of a feeding pump 43 at a constant flow rate. The flow rate of the inorganic flocculation agent G1 is measured by a flow meter 49.

On the other hand, stock solution of the anionic high molecular flocculating agent G2 reserved in a flocculation stock solution tank 30 is pumped to a flocculating agent diluting tank 33 by a pump 32 which is driven in response to a level signal from the level gauge 31. Diluting water is charged into the flocculating agent diluting tank 33 having an agitator via the flow regulating valve 16 so that the stock solution is diluted to a diluting ratio of about 1/10 to 1/400 relative to the diluting water.

Control of the amount of the supplied high molecular flocculating agent G2 is conducted by measuring the amount of the flocculating agent tank 33 and the flocculating agent tank 39 by means of level gauges 34, 35 and 36 disposed therein and energization of the pump 37 and the addition amount of the diluting water by the flow regulating valve 16 is controlled by the control unit 37 to provide the above mentioned diluting ratio of the high molecular flocculating agent. The diluted high molecular flocculating agent G2 is reserved in the anionic high molecular flocculating agent tank 39 via the operation valve 38 under control of the control unit 37 and is continuously fed to the entrance of the second blender 24B by means of feeding pump 40 at a constant flow rate. The amount of the supplied high molecular flocculating agent G2 is measured by a flow meter 46. Control of the supply of the inorganic flocculating agent G1 and the high molecular flocculating agent G2 is conducted by controlling the rotational speeds of the feeding pumps 43 and 40 via inverters 47 and 48, respectively under control of the control unit 22. The addition ratio of the flocculating agent is preset by presetting devices 60 and 61.

The relation between the specific weight and the appropriate amount of the flocculating agent to be added is preliminarily determined and the amount of the flocculation agent to be added is controlled so that the amount of the flocculating agent which is appropriate to the current specific weight of the sludge is added. Very excellent floc can be formed by adding and mixing the first inorganic flocculating agent to and with untreated sludge containing much clay and silt at a ratio of 3000 to 9000 g/cm$^3$ and then by adding and the anionic high molecular flocculating agent at a ratio of 500 to 1500 g/cm$^3$ although the addition ratio varies with the properties of the sludge. Addition of single high molecular flocculating agent G2 enables excellent floc to be formed. We have confirmed that combined use of the inorganic and anionic high molecular flocculating agents is most suitable for the treatment of such sludge.

A setting agent may be added according to needs if the strength of the resultant dehydrated cake which is obtained by dehydration of the sludge is insufficient. The setting agent may include cement, cement containing setting agent, gypsum, lime, earth improving high molecular composite materials which have been developed recently and the like.

Solid-liquid separation of the sludge is carried out in the dehydrating machine 25. The dehydrating machine 25 uses filter fabric and exhibits best dehydrating performance due to the fact that the specific weight of the sludge has been adjusted by the preliminary treatment of the sludge. The machine 25 may include filter press, vacuum dehydration machine, belt press and the like. Since the filter press is operated on a batch basis, the fed sludge is supplied for each squeeze. Since the vacuum dehydrating machine and the belt press are operated on a continuous basis, the sludge is continuously supplied thereto. The dehydrated cakes which are generated by the dehydrating machine 25 are loaded on a flat dump 52 for transportation. The amount of the sludge supplied to the dehydrating machine 25 depends upon the capacity of the dehydrating machine, preferably may be the maximum dehydration capacity (±5%) which is determined by the sludge specific weight.

The separated water which has been separated by the dehydrating machine 25 is reserved in the separated water tank 26 and some of the separated water in the tank 26 is charged into the continuous kneading mixer 12 by the pump 27 for diluting the sludge. Prior to initiating the sludge treatment, water is supplied to the separated water tank 26 via the operation valve 15 to fill the tank 26 with water.

On the other hand, excess separated water tank 26 is discharged to a sewage. If the separated water is separated from the alkaline sludge which contains much cement milk, a neutralization treatment is necessary prior to sewage. At this end, the separated water is fed to a pH adjusting machine 50 in which it is added with water and is mixed with diluted sulfuric acid and the like for neutralization treatment and then discharged to sewage.

The separated water tank 26 is partitioned into a filtrate settling zone A and a separation clarification zone B by a partition wall 58. The separated water from the belt press 25 is temporarily charged into the filtrate settling zone A. The sludge settles on the bottom of the filtrate settling zone A. Supernant water over flows over the partition wall 58 into the separation clarification zone B. When the sludge which settles in the settling zone A reaches the level which is monitored by the level gauge 45, it will be pumped to the untreated sludge tank 3 by a pump 44. The clarified water in the clarification zone B is fed to the belt press 25 by means of pump 57 and is used also as washing water.

The present invention is preferably applicable to treatments of sludge which is generated by various construction workings such as ground improving working, dredging, formation of cut-off wall in association with column construction, formation of foundation structures such as underground continuous walls and pipes and tunnel boring as well as the above mentioned jetting and agitating ground improving working such as C-JG working and JSG working.

In accordance with the present invention, dehydrating treatment is carried out while the sludge's specific weight is adjusted to not higher than 1.35. It is confirmed that when the specific weight of the sludge exceeds 1.35, clogging of pumps on the suction side, adhesion of sludge and clogging of conveyor pipes and hoppers may occur although conveyance of the sludge by squeeze pump or snake pump is not impossible. As a result of this, treatment of the sludge is difficult. In contrast to this, dehydrating treatment after the sludge has been preliminarily diluted in accordance with the present invention enhances conveyance and handling characteristics.

It is better to use the above mentioned continuous kneading mixer (also referred to as colloid mixer) than mixers having general agitators for conducting dilution since it provides a more remarkable agitation dispersion effect and enables the sludge to be adjusted to a stable sludge content.

Combination of the inorganic flocculating agent and the high molecular flocculating agent is excellent for flocculation of such sludge.

The reasons for this are not known. However, it is deemed that the inorganic flocculating agent forms floc to some extent and then the high molecular flocculating agent will enlarge the resultant floc. Preferably the addition ratio of the inorganic flocculating agent and the high molecular flocculating agent (particularly, anion agent) per sludge weight is 3000 to 9000 g/m$^3$ and 300 to 1500 g/m$^3$ (more preferably, 500 to 1100 g/m$^3$), respectively. The high molecular flocculating agent is added for diluting the sludge to provide the above mentioned addition ratio.

If the belt press is used, flocculating effect can be determined by measuring the thickness of the floc in the gravity settling zone from the surface of the belt by means of sonic wave thickness gauge or by measuring the amount of leaked floc from the side of the belt.

It is preferable to achieve the two-stage flocculation with blenders 24A and 24B as is done in the above mentioned system. It is possible to adopt an intermittent process in which the high molecular flocculating agent is added after performing the first flocculation with the inorganic flocculating agent. However, it is preferable to conduct the continuous flocculating treatment by two stage flocculation if the whole treatment system is considered. It is preferable to subject the flocculation treatment finished sludge to dehydration by a dehydrating machine such as belt press without breaking the flocculation state. At this end, the belt press 25 is provided below the blender 24B in the foregoing embodiment.

EXAMPLE 1

Bentonite sludge having a specific weight of 1.38 which was obtained from a ground improving working spot was added with diluting water to change its specific weight. The mixture was added with a high molecular flocculating agent (polyacrylamide partial hydrolyzate) having physical properties shown in Table 1 at various amounts. The mixed sludge is dehydrated with the belt filter. The water content and flocculation state of the sludge is observed to determine the optimum amount of the added high molecular flocculating agent for the specific weight. A result of this is shown in FIG. 2.

TABLE 1

| CONTENT | POLYACRYLAMIDE |
|---|---|
| ION | ANIONIC |
| ESTIMATED MOLECULAR WEIGHT | 900 × 10$^4$ |
| COLOR | MILK WHITE OR LIGHT YELLOW RED |
| SPECIFIC WEIGHT | 1.06 TO 1.10 |
| VISCOSITY OF STOCK SOLUTION (CP) | 700 TO 3000 |
| pH OF 0.25% AQUEOUS SOLUTION | 7.5 TO 9.0 |
| VISCOSITY OF 0.25 AQUEOUS SOLUTION (CP) | 200 TO 400 |
| APPLICABLE SOLUBLE CONCENTRATION (%) | 0.15 TO 0.5 |

Figure 2:
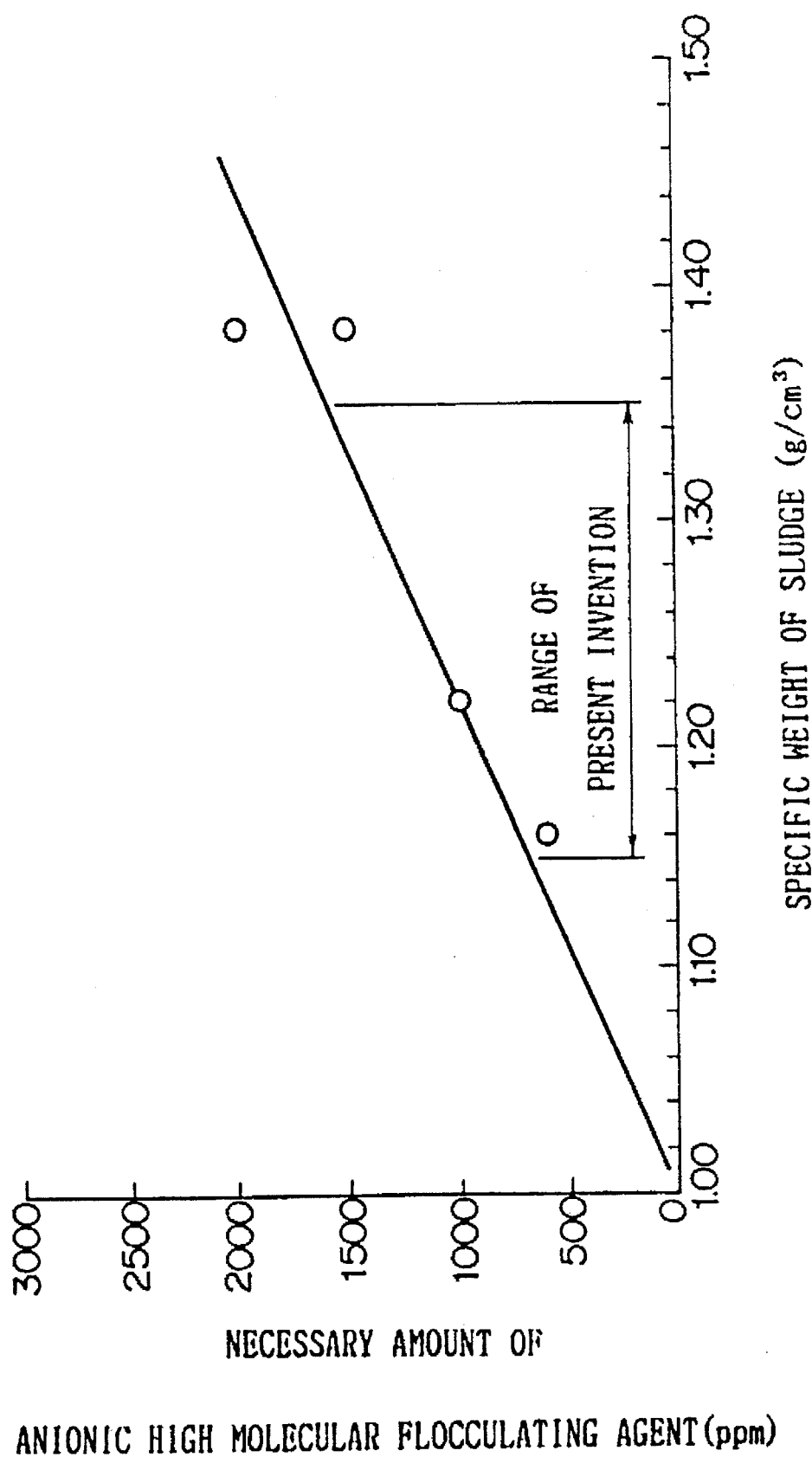
FIG. 2 is a graph showing the relation between the sludge's specific weight and the amount of the high molecular flocculating agent (flocculant) in Example 1.
Figure 3:
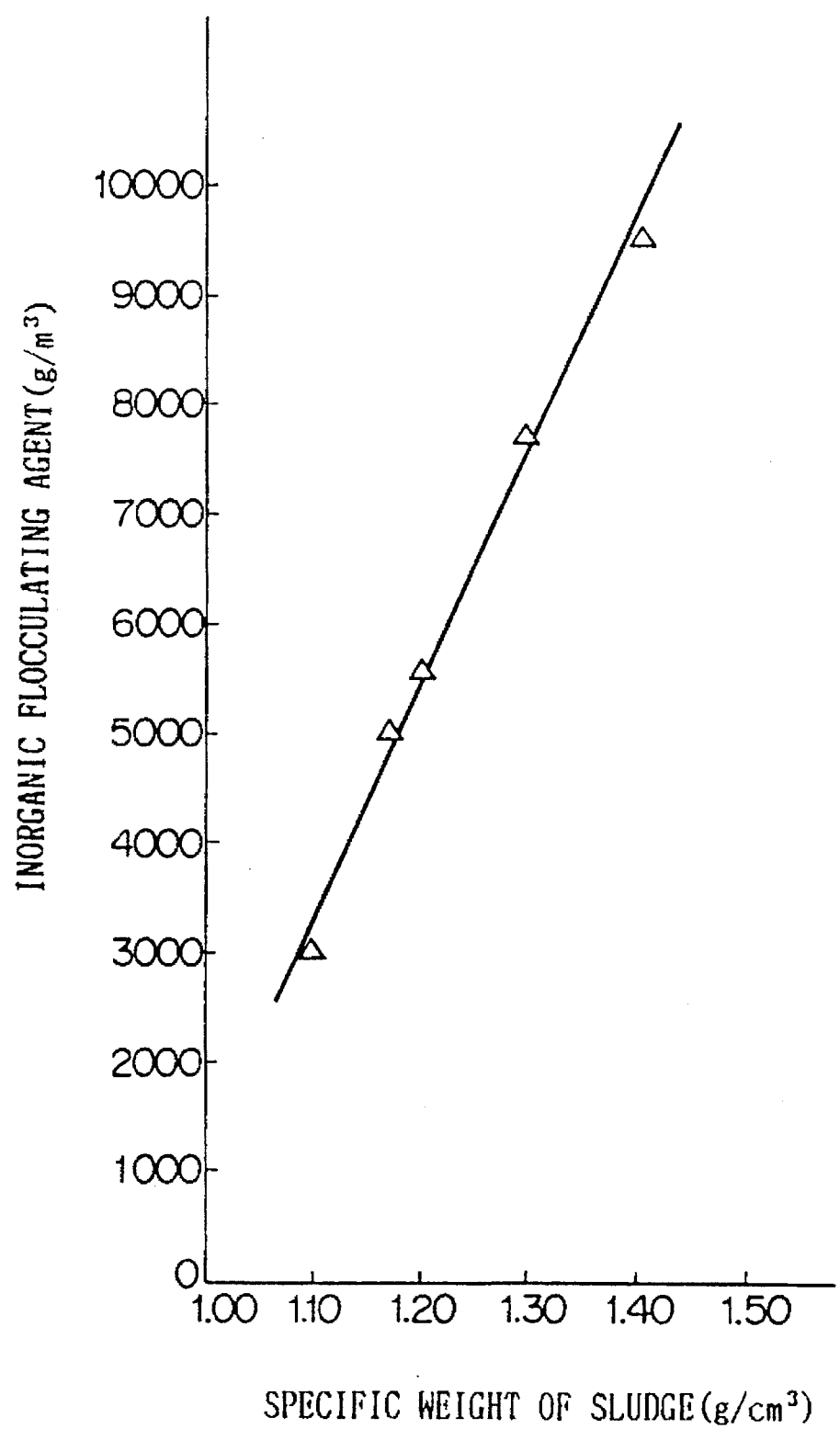
FIG. 3 is a graph showing the relation between the sludge's specific weight and the amount of the inorganic flocculating agent in Example 1.

It is understood from FIG. 2 that the optimum amount of the high molecular flocculating agent to be added is proportional to the specific weight of the sludge and can be thus uniquely determined in accordance with the specific weight of the sludge if it is known.

As mentioned above, a graph representing the relation between the sludge's specific weight and the optimum amount of the added flocculating agent is preliminarily determined. The amount of the added flocculating agent can be determined in accordance with a curve showing the relation between the sludge specific weight and the amount of the flocculating agent amount for the practical sludge dehydrating treatment.

EXAMPLE 2

The optimum value of the flocculating agent to be added was determined depending upon the specific weight of the sludge through the observation of flocculating state. An experiment was conducted on clogging of the belt press on continuous operation basis.

In this experiment, the sludge having a specific weight of 1.38 which was used in Example 1 was not diluted and was added with 1700 g/m$^3$ of the high molecular flocculating agent which was determined from the graph of FIG. 2 and was continuously dehydrated by the belt press dehydrating machine. As a result of this, dehydrated sludge having a water content of 30% was discharged from the belt press dehydrating machine. Clogging of the filtrating fabric occurred 20 minutes after starting of operation and operation had to be stopped 30 minutes after clogging.

Dehydration was continuously conducted by the belt press dehydrating machine for two cases in which the untreated sludge having a specific weight of 1.3 was diluted with water to provide a specific weight of 1.34 and 1.22 and then added with 1500 g/m$^3$ and 100 g/m$^3$ of the high molecular flocculating agent which was determined by the graph of FIG. 2, respectively. As a result of this, dehydrated sludge having a water content of 30% was discharged for an extended period of time without occurrence of clogging of filter fabric and the dehydration treatment could be stably carried out.

The present invention makes it possible to stably conduct dehydration treatment in a dehydrating machine by diluting untreated sludge to provide a specific weight not higher than 1.35. The lower limit of the specific weight of the diluted sludge is 1.15 in accordance with the present invention in consideration of lowering of the treatment efficiency with an increase in the amount of the sludge to be treated due to dilution.

EXAMPLE 3

In Example 3, an experiment in a laboratory was conducted for silt-cement grout mixed slurry (sample 1) and the silt slurry having physical properties shown in left column of Table 2 by variously changing the amount of the high molecular flocculating agent to confirm its flocculation effect and to choose the flocculating agent, to determine the sludge specific weight-flocculating agent addition curve and to determine dehydration conditions.

EXPERIMENT PROCESS

Gravitational dehydrating properties were determined by Nutsche experiment for sample sludge which was added with various flocculating agents to generate floc and squeeze dehydration experiment was conducted for gravitationally dehydrated cakes (first dehydrated cakes) by variously changing squeeze conditions in relation to pressure and time to determine squeeze dehydration properties.

Figure 4:
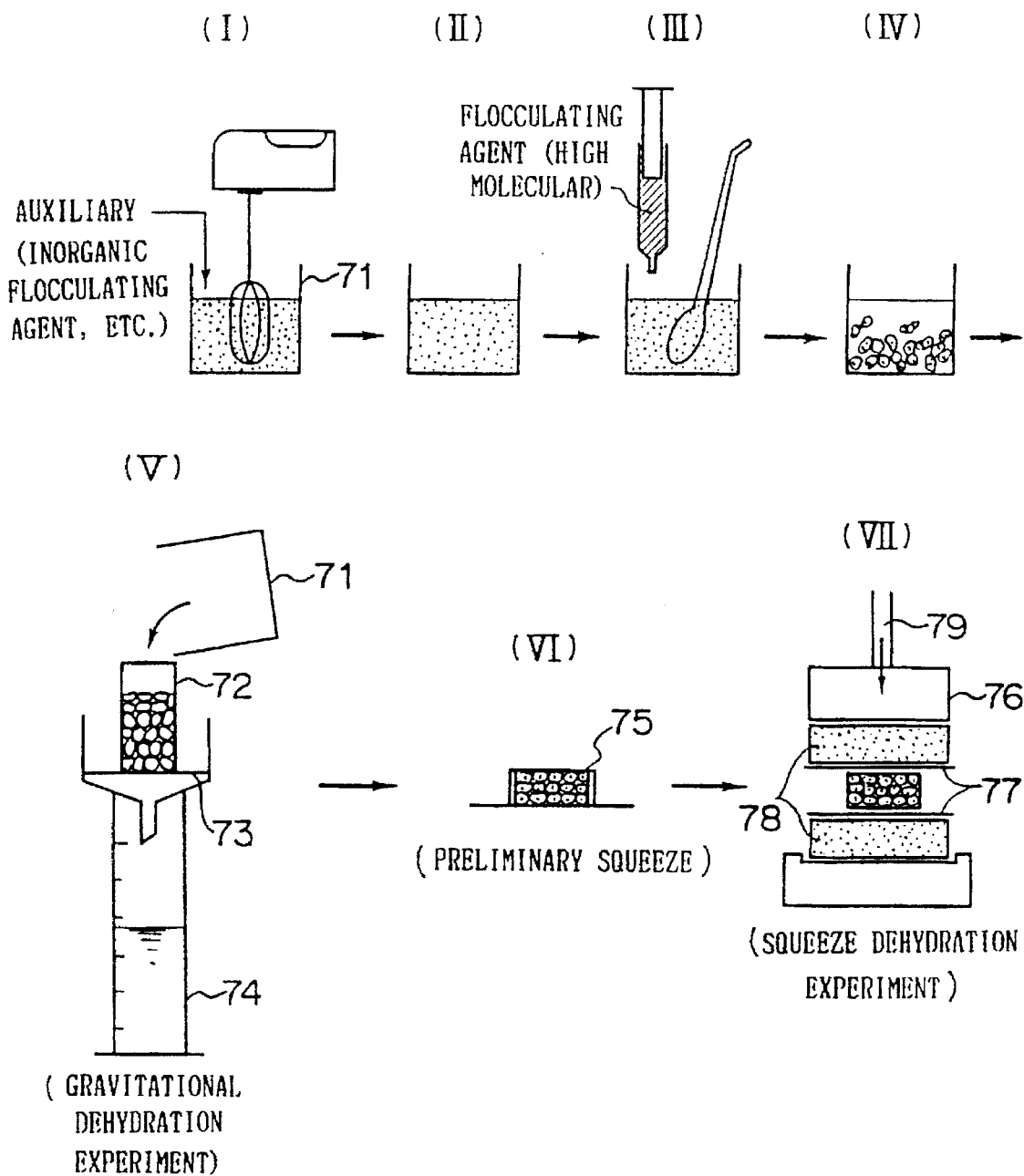
FIG. 4 is a schematic view showing the steps of an experiment in Example 3.
Figure 5:
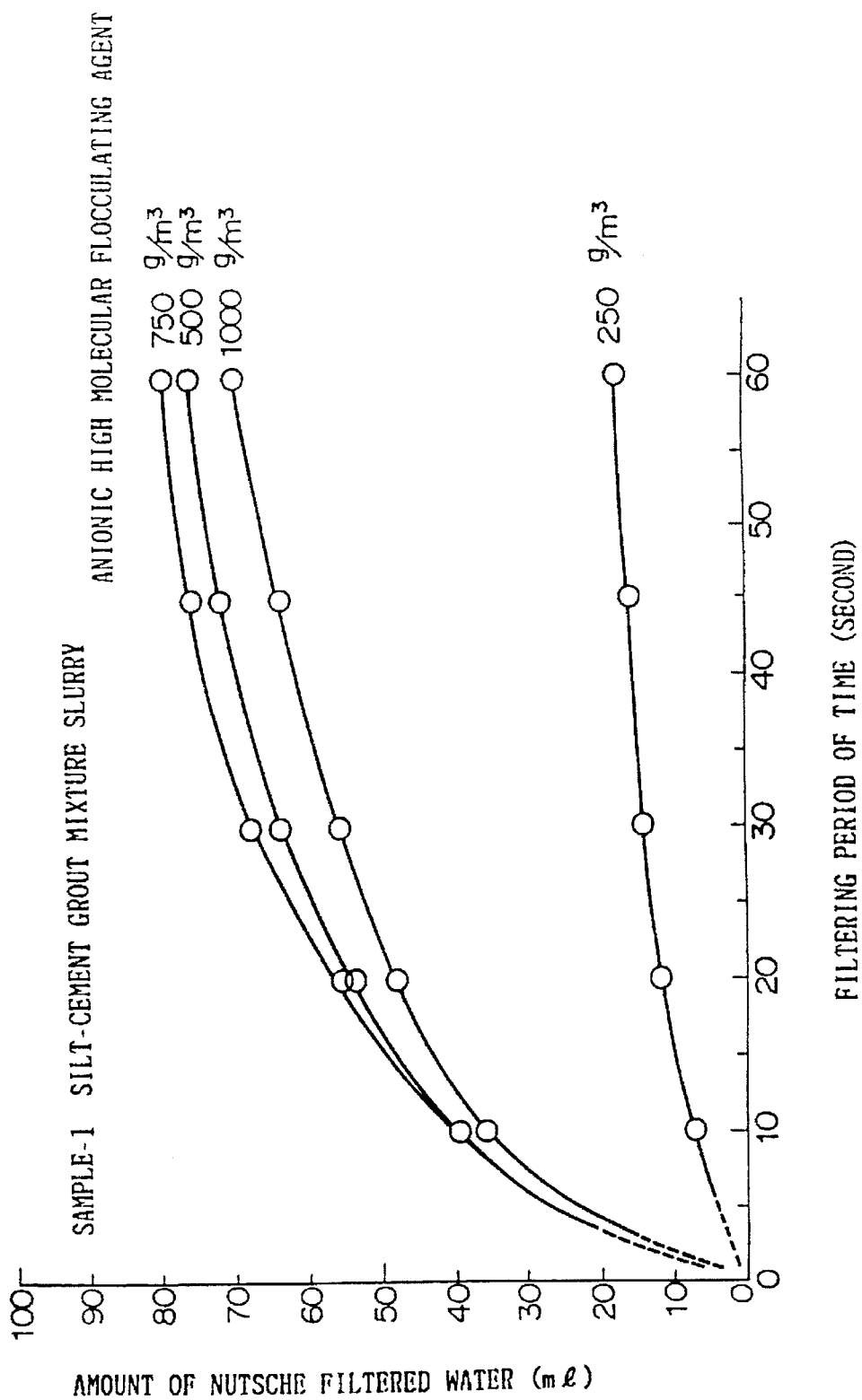
FIG. 5 is a graph showing the relation between filtering period of time and the amount of the Nutsche filtered water from Sample 1 in Example 3.

Specifically, an experiment was conducted in accordance with a process shown in FIG. 4.

A sample of sludge was charged into a container 71 and agitation is conducted with a hand mixer for 20 seconds. If an inorganic flocculating agent is added as a preliminary treatment, the agent is added in this stage to confirm that flocculation state.

At subsequent steps III and IV, a given amount of the high molecular flocculating agent was added and agitation was conducted. Floc are settled by leaving the mixture as it is and the stability of floc was confirmed by means of spurtel.

At step V, a full amount of the mixture is loaded on a frame 72 of a filter fabric 73 to carry out a gravitational dehydration experiment by collecting dropped filtered water on a measuring cylinder 74. After a gravitationally dehydrated cake was packed in a cylindrical frame 75 having dimensions of 30 cm×17.7 cm as shown as step VI, the cake was squeezed by a squeeze dehydrating test machine 76 at step VII. The formed sample cake was sandwiched between two sheets of filter fabric and pressed by means of pneumatic actuator 79.

Results of experiments which were conducted in accordance with the experiment process are summarized in Tables 2 and 3.

TABLE 2

| | | | | | | Nutsche (gravitational dehydration) experiment | | | | | | |
| --- | --- | --- | --- | --- | --- | --- | --- | --- | --- | --- | --- | --- |
| | Chemicals to be added | | | | Filtering characteristics | | | | | | Hutsche cake's | Hand |
| | | Adding ratio | | | Filtering time (sec) and amount | | | | | | stability | squeeze |
| | | per sludge | per SS | Floc | of filtered water (ml) | | | | | clear- | Water content | charac- teristics |
| Object | Chemicals | (g/m$^2$) | (%) | size No. | 10 | 20 | 30 | 45 | 60 | ness | (%) | Determination |
| Sample-1 (mixed slurry) PH 12.5 γ = 1.21 ds = 31.23% | Anionic high molecular flocculating agent | 250 500 750 1000 | 0.08 0.16 0.24 0.32 | 3 6–7 6 5 | 7 40 40 36 | 12 54 56 48 | 14 64 68 56 | 16 72 76 64 | 18 76 80 70 | ○ ○ ◉ ◉ | — 56.7 — 59.0 | x ◉ ◉ ◉ | x o ◉ ◉ |
| Sample-2 (silt slurry) PH 8.6 γ = 1.17 ds = 24.2% | Anionic high molecular flocculating agent | 250 375 750 | 0.10 0.15 0.31 | <1 <1 2–3 | — — — | — — — | — — — | — — — | — — — | — — — | — — — | — — — | — — — |
| | Cationic high molecular flocculating agent | 250 1500 | 0.10 0.62 | <1 <1 | — — | — — | — — | — — | — — | — — | — — | — — | — — |
| | Ahmfa/ Chmfa* | 375/500 375/625 375/750 | 0.15/0.20 0.15/0.26 0.15/0.31 | 5 6–7 7 | — — 26 | — — 30 | — — 35 | — — 40 | — — 45 | — — Δ | — — — | — — Δ | — — Δ |
| | Inorganic** flocculating | 6000/500 | 2.4/0.20 | 6 | 20/40 | 24/48 | 26/52 | 27/54 | 28/56 | ◉ | — | ◉ | ◉ |

TABLE 2-continued

| | | Chemicals to be added | | Nutsche (gravitational dehydration) experiment | | | | | | | Hutsche cake's stability | Hand squeeze characteristics |
|---|---|---|---|---|---|---|---|---|---|---|---|---|
| | | Adding ratio | | Floc size No. | Filtering characteristics | | | | | | | |
| | | per sludge | per SS | | Filtering time (sec) and amount of filtered water (ml) | | | | | clear-ness | Water content (%) | |
| Object | Chemicals | (g/m$^2$) | (%) | | 10 | 20 | 30 | 45 | 60 | | | Determination |
| | agent 1/ Ahmfa Inorganic flocculating agent 2/ Ahmfa | 5000/625 | 2.1/0.26 | 6 | 34/58 | 38/76 | 40/80 | 41/82 | 42/84 | ◉ | — | ◉ | ◉ |

*Ahmfa and Chmfa stand for "Anionic high molecular flocculating agent" and "Cationic high molecular flocculating agent", respectively.
**Inorganic flocculating agents 1 and 2 are polyaluminium chloride and calcium chloride, respectively.

TABLE 3

| | Chemicals to be added | | | Squeeze experiment | | | | | | |
|---|---|---|---|---|---|---|---|---|---|---|
| | | Adding ratio | | Conditions | | Dehydrated cake | | | Water | Treating amount |
| Object | Chemicals | per sludge (g/m$^2$) | per SS (%) | Pressure kg/cm$^2$ | Time sec | Spread cm | Separating ability | | content % | Filtering rate (kg-ds/m-H) |
| Sample-1 (mixed Slurry) PH 12.5 γ = 1.21 ds = 31.23% | Anionic high molecular flocculating agent | 500 | 0.16 | 0.2 | 15 | 4.8 | o | | 45.7 | 5057 |
| | | | | 0.5 | 15 | 5.0 | o | | 42.7 | 4622 |
| | | | | 1.0 | 15 | 5.1 | o | | 39.7 | 4760 |
| | | 750 | 0.24 | 0.2 | 15 | 4.9 | o | | 46.0 | 4876 |
| | | | | 0.2 | 30 | 4.8 | o | | 45.5 | 2567 |
| | | | | 0.5 | 15 | 4.9 | o | | 42.6 | 4742 |
| | | | | 0.5 | 30 | 5.0 | o | | 41.6 | 2352 |
| | | | | 1.0 | 15 | 5.0 | o | | 38.7 | 4594 |
| | | | | 1.0 | 30 | 5.0 | o | | 38.0 | 2233 |
| | | | | 1.0 | 60 | 5.0 | o | | 37.0 | 1183 |
| | | 1000 | 0.32 | 0.2 | 15 | 4.8 | o | | 47.7 | 4587 |
| | | | | 0.5 | 15 | 5.0 | o | | 44.2 | 4293 |
| | | | | 1.0 | 15 | 5.0 | o | | 40.9 | 4116 |
| Sample-2 (silt slurry) PH 8.6 γ = 1.17 ds = 24.2% | Inorganic* flocculating agent 1/Ahmfa** | 6000/500 | 2.4/0.20 | 0.2 | 15 | 5.0 | o | | 46.1 | 4224 |
| | | | | 0.5 | 15 | 5.1 | o | | 43.0 | 4148 |
| | | | | 1.0 | 15 | 5.3 | o | | 39.9 | 4145 |
| | Inorganic flocculating agent 2/Ahmfa | 5000/625 | 2.1/0.26 | 0.2 | 15 | 5.0 | o | | 44.5 | 4755 |
| | | | | 0.5 | 15 | 5.0 | o | | 41.8 | 4864 |
| | | | | 1.0 | 15 | 5.1 | o | | 39.0 | 4729 |

*Inorganic flocculating agents 1 and 2 are polyaluminium chloride and calcium chloride, respectively.
**Ahmfa stands for "Anionic high molecular flocculating agent".

1) Compatibility of sludge species with flocculating agents

Figure 6:
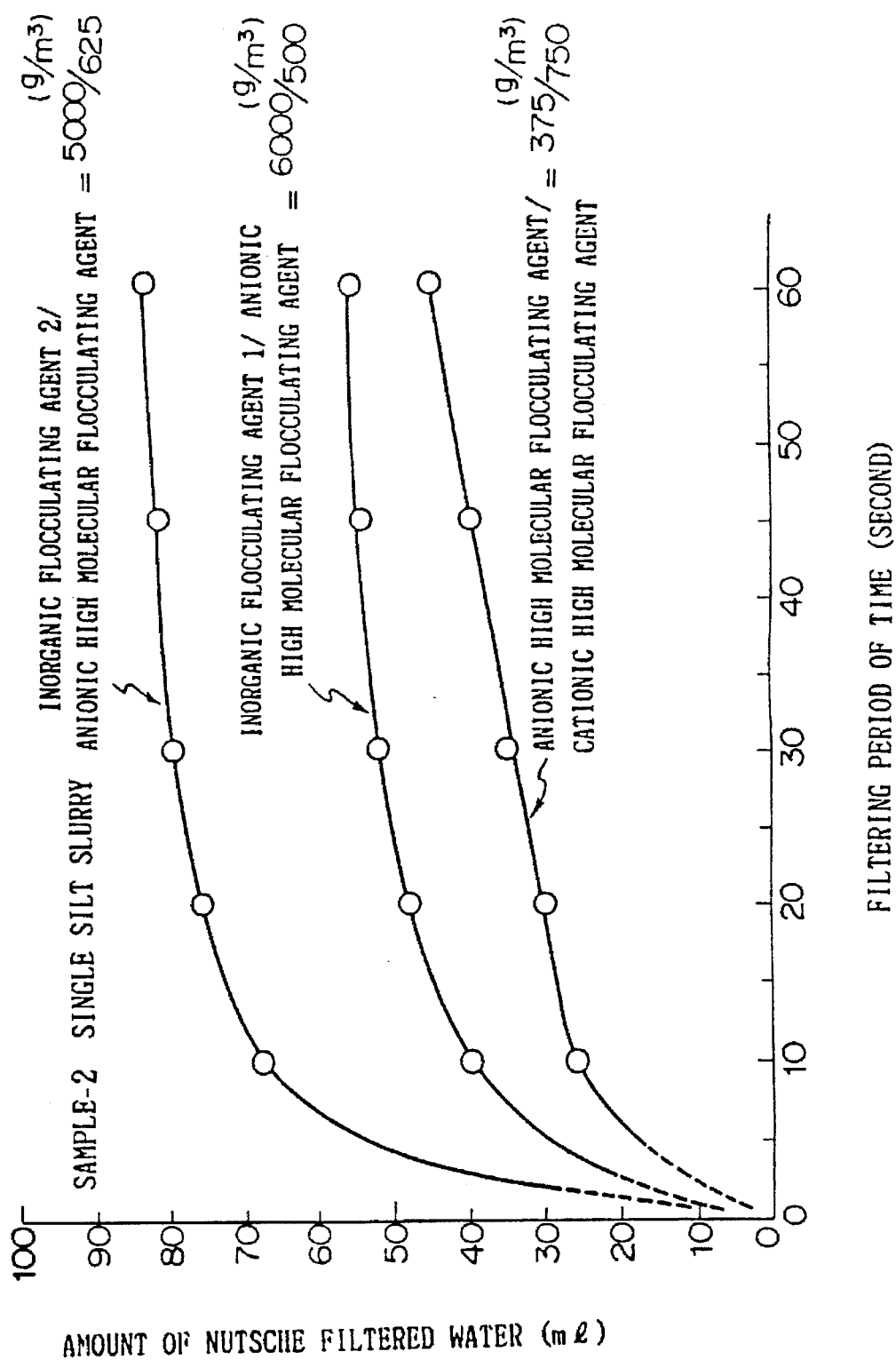
FIG. 6 is a graph showing the relation between filtering period of time and the amount of the Nutsche filtered water from Sample 2 in Example 3.

Sample 1 exhibited most excellent floc filtering characteristics as shown in FIG. 6 showing the experiment results of filtering characteristics when single anionic high molecular flocculating agent was added at 750 g/cm$^3$ (0.24% per ss) per sludge.

In contrast to this, sample 1 exhibited very poor floc formation characteristics and the filtering performance experiment was impossible when a single anionic high molecular flocculating agent was used as is apparent from Table 2 in FIG. 6 showing the results of filtering performance experiments. An improving effect was not satisfactory even when single cationic high molecular flocculating agent or combination of it with anionic high molecular flocculating agent was used. Combination of inorganic flocculating agent with anionic high molecular flocculating agent exhibited an excellent result. Particularly, combination of inorganic flocculating agent (polyaluminium chloride or calcium chloride) exhibited very excellent water filtering characteristics. Accordingly, combination of inorganic flocculating agent and anion high molecular flocculating agent was most effective for sludge containing silt or much silt content. In this case, the amounts of added inorganic and anionic high molecular flocculating agents were 5000 g/m$^3$ and 625 g/m$^3$ (0.26% per SS) per sludge, respectively.

2) Sludge species and determination of necessary ratio and the amount of flocculating agent to be added.

Figure 7:
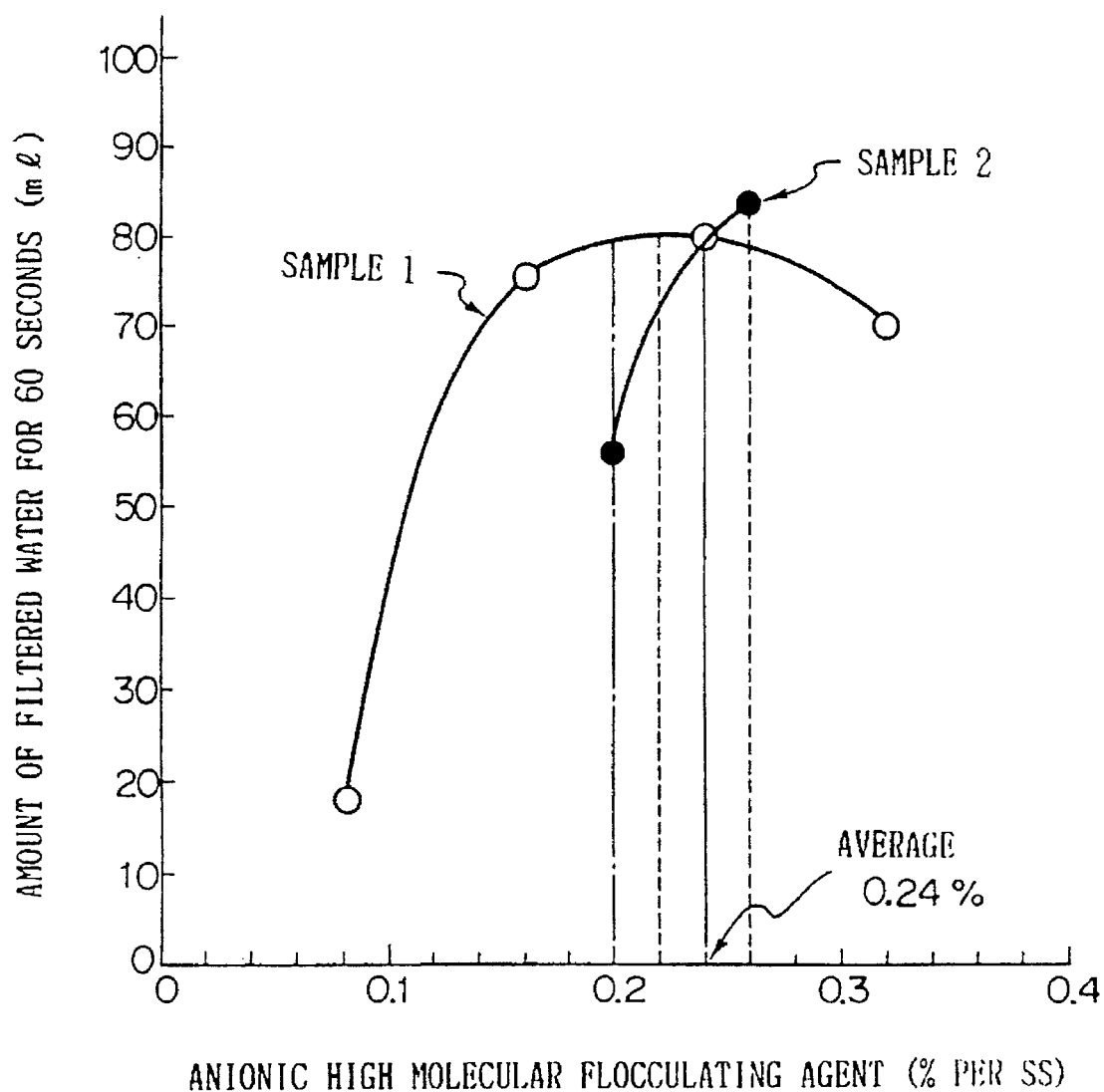
FIG. 7 is a graph showing the relation between the ratio of added anionic high molecular flocculating agent per SS and the filtered water per SS and the filtered water amount for 60 seconds in Example 3.
Figure 8:
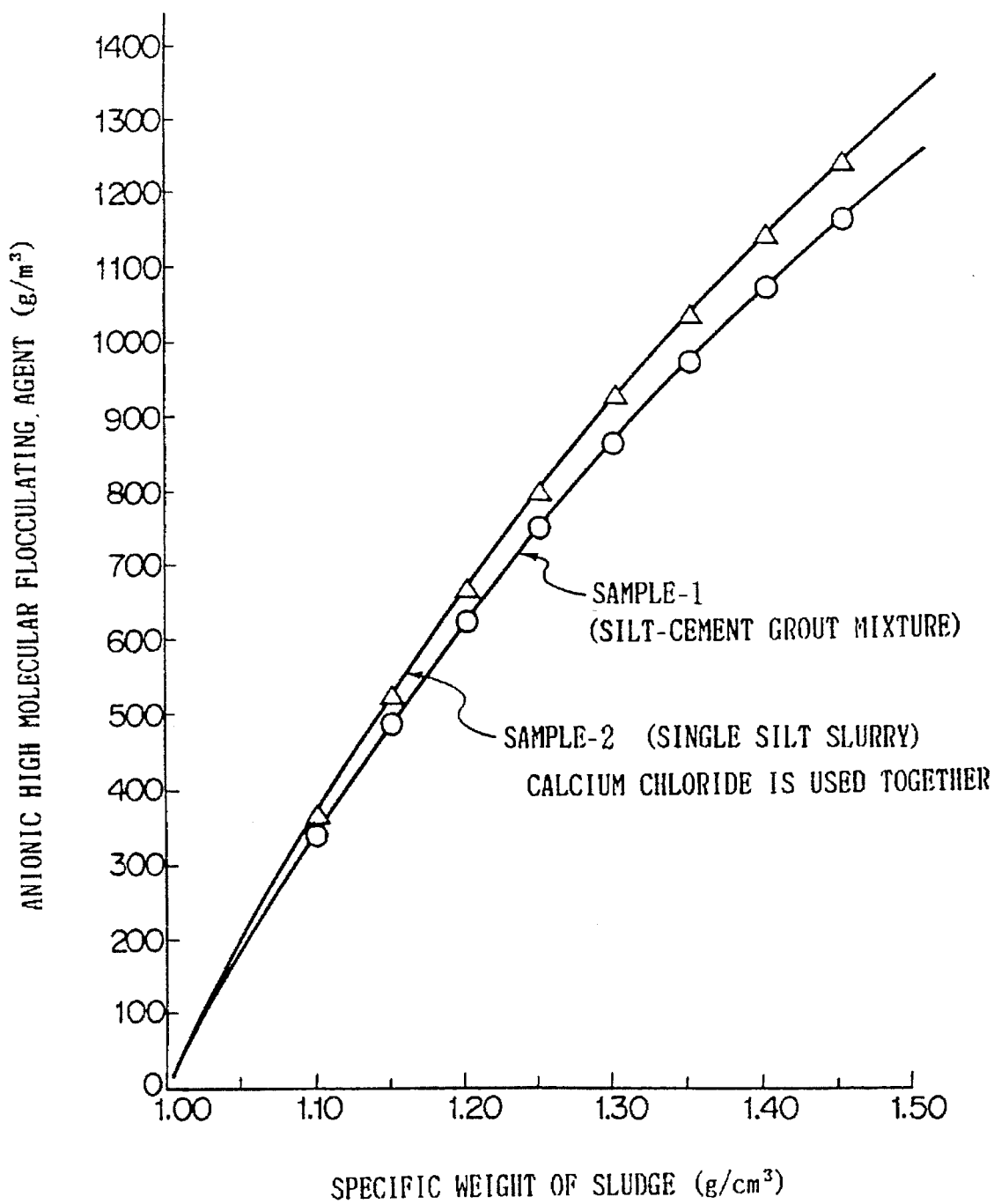
FIG. 8 is a graph showing the relation between the specific weight of the sludge and the necessary amount of the anionic high molecular flocculating agent in Example 3.

The relation between the ratio of the anionic high molecular flocculating agent to SS and the amount of filtered water generated 60 seconds after Nustche (gravitational) filtering on samples 1 and 2 was traced in FIG. 7 based upon the results of experiment of Table 2. It is understood from a curve traced in FIG. 7 that the ratio the flocculant to be added to SS to obtain excellent floc filtering characteristics be 0.22 to 0.26%, on an average 0.24. If the ratio of the flocculant to SS is determined, the necessary amount of the flocculant per sludge corresponding to the sludge specific weight of the samples 1 and 2 are determined with reference to 0.24% per SS which is appropriate for the floc filtering characteristics as shown in FIG. 8. Combination with the inorganic flocculating agent is a prerequisite for sample 2. Accordingly, if the sludge corresponding to samples 1 and 2 are dehydrated, the amount of the flocculating agent is controlled in accordance with a sludge specific weight-flocculating agent amount curve shown in FIG. 8.

3) Relation between squeeze pressure, time, cake water content

As is apparent from FIG. 9, the water content of a dehydrated cake largely varies with squeeze pressure. Gravitationally dehydrated sludge having a water content of about 58% has water contents of 45.5, 42, and 38% after it is squeezed at a pressure of 0.2, 0.5, 1 kg/cm$^2$, respectively (squeeze time of 30 seconds). It is understood that from extrapolation of lowering tendency of cake water content that the squeeze pressure should be 1.5 and 2.5 kg/cm$^2$ to provide the water content of cake of 35 and 30%, respectively.

On the other hand, as is apparent from FIG. 10, the relation between the squeeze time and the cake water content shows that the water content decreases as the squeeze period of time extends for the same squeeze pressure and that it decreases with an increase in the squeeze pressure. FIG. 10 shows that sample 1 has excellent dehydration characteristics and continuous dehydration effect for each pressure stage is obtained by keeping a squeeze pressure for a period of time as long as possible. FIG. 10 shows the relation between content, squeeze time and pressure of sample 1. Since the same effect is obtained for sample 2, it is expected that excellent dehydration effect is obtained if the high molecular flocculating agent is used together with inorganic flocculating agent and preliminary treatment is properly carried out.

4) Relation between squeeze pressure, time and filtering rate

Figure 11:
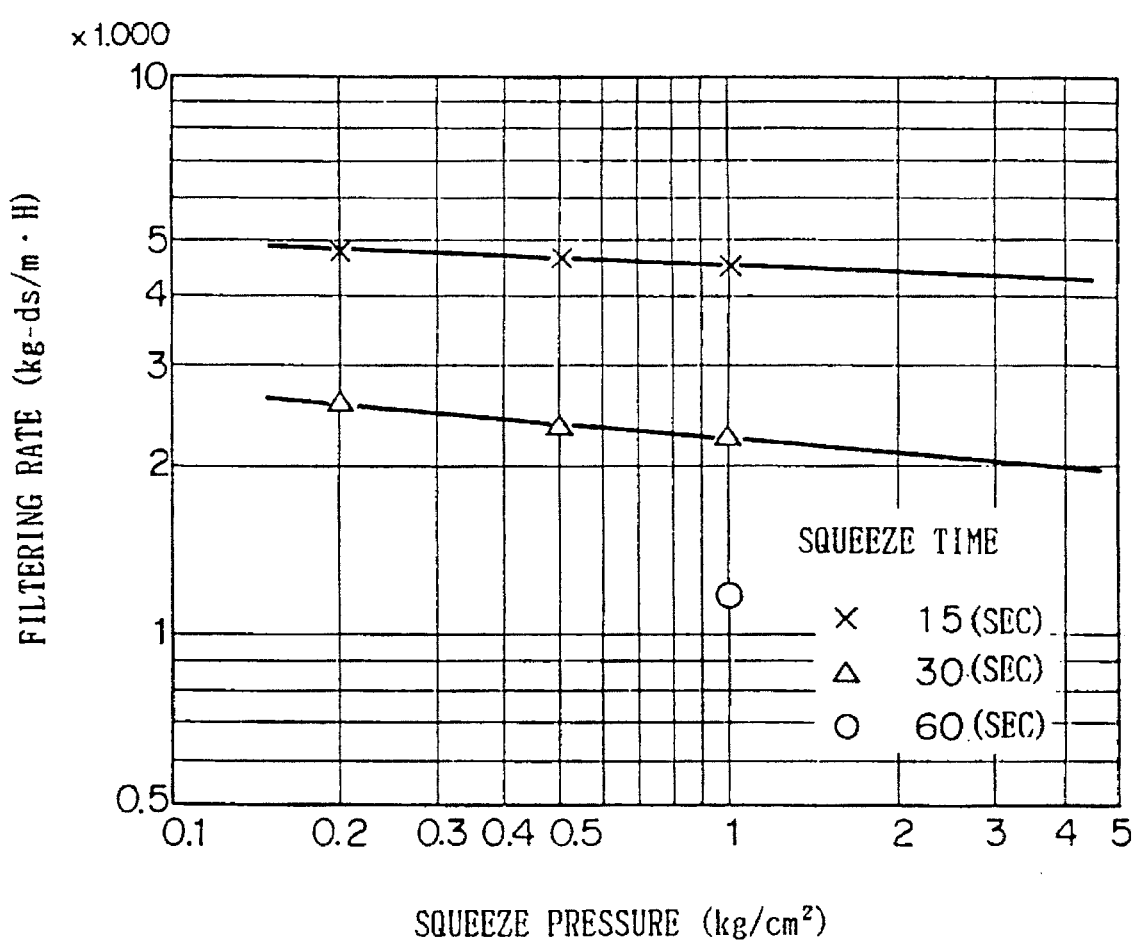
FIG. 11 is a graph showing the relation between the squeeze pressure and the filtering rate in Example 3.
Figure 12:
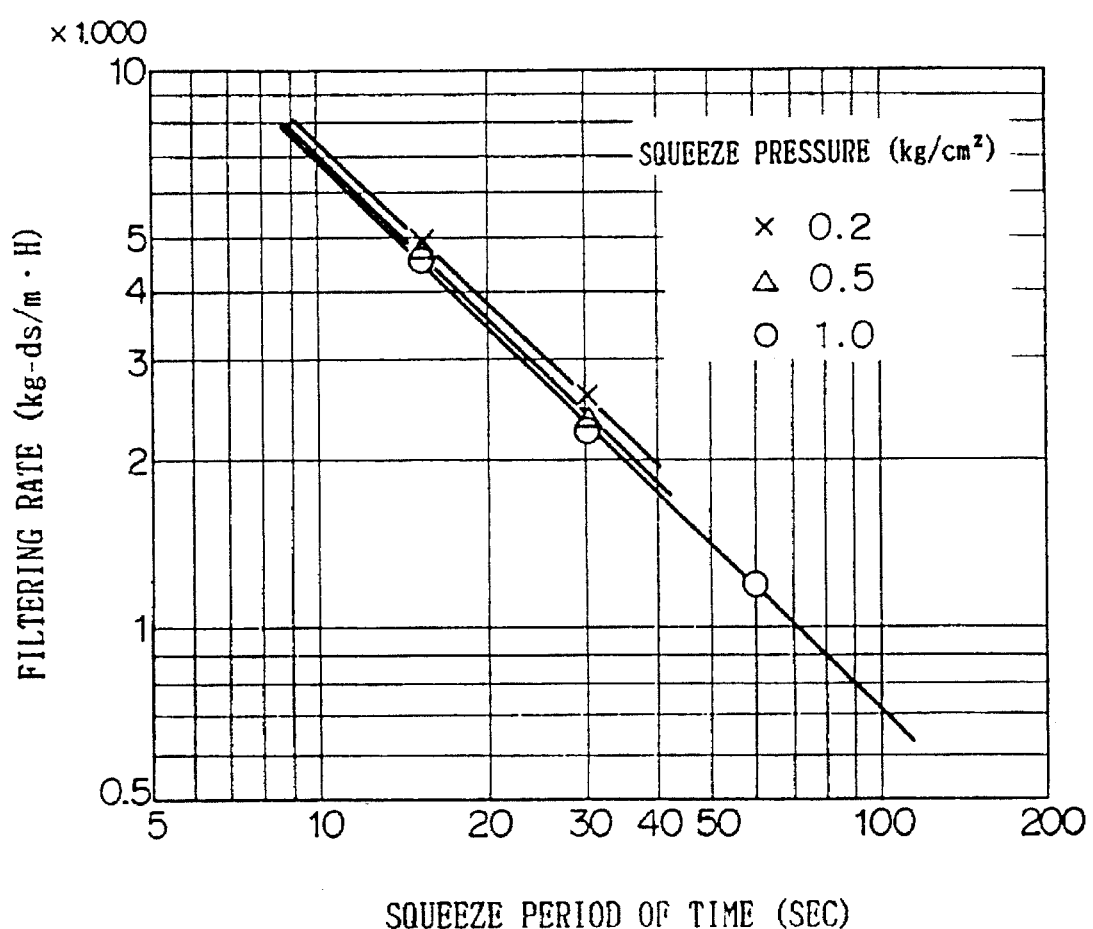
FIG. 12 is a graph showing the relation between the squeeze period of time and the filtering rate in Example 3.

The relations between squeeze pressure, time and filtering rate are shown in FIGS. 11 and 12. It is understood from these relations that the filtering rate more largely depends upon the squeeze time than the squeeze pressure. The squeeze time is inversely proportional to the filtering speed. The filtering speeds after 30 and 60 second squeeze is reduced by half to 2250 and 1180 kg.ds/m.h.

Figure 13:
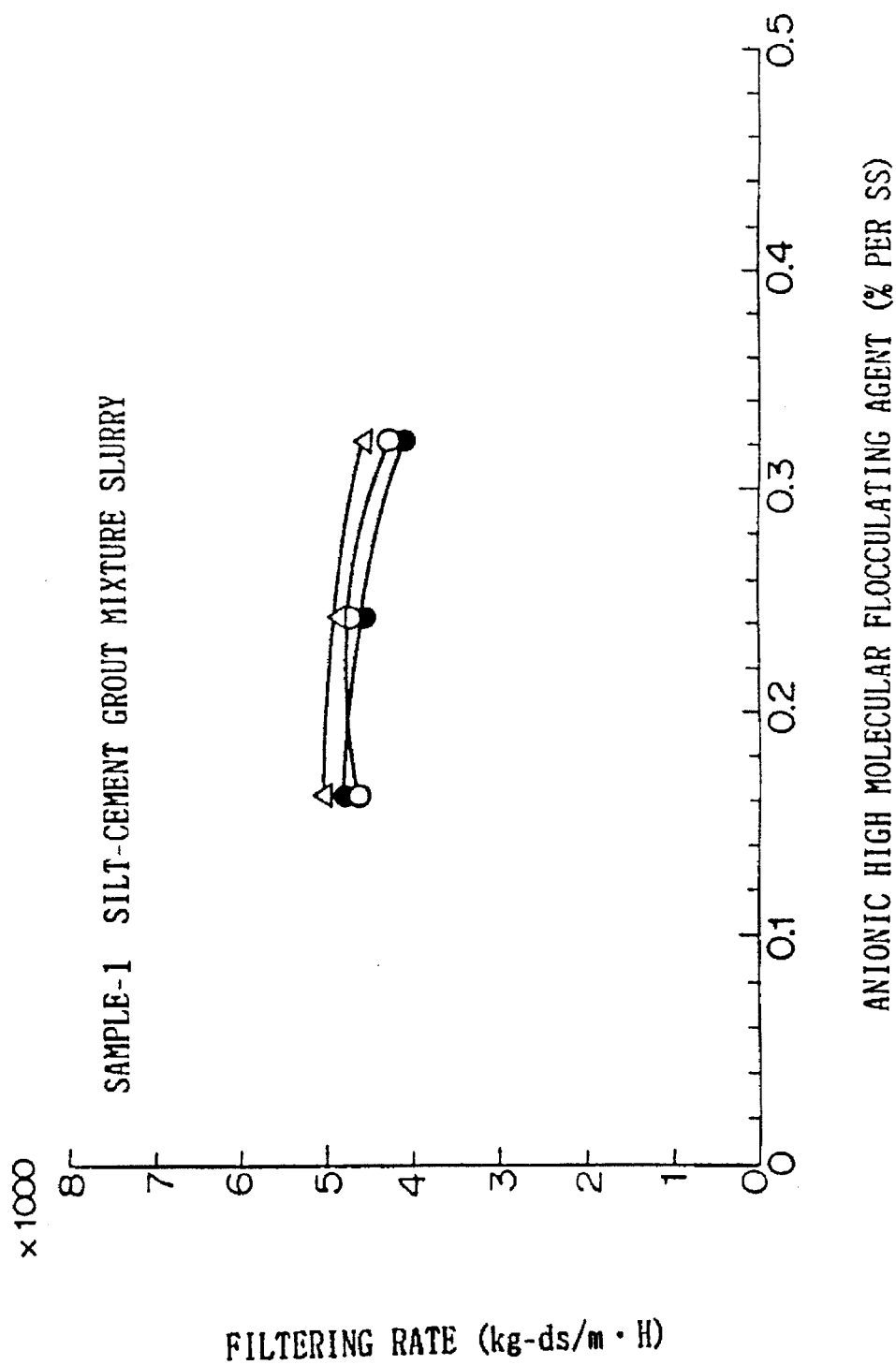
FIG. 13 is a graph showing the relation between the rate of added anionic high molecular flocculating agent per SS and the filtering rate.

5) Relation between the amount of the flocculating agent to be added, cake water content and filtering rate The relation between the amount of the added anionic high molecular flocculating agent per SS and the filtering rate is shown in FIG. 13. When the amount is about 0.24%, the change in filtering rate is low. The difference in the amount of added flocculant will not largely change the filtering rate. However, when the ratio of the flocculant to sludge is 0.3% or more, an influence will occur. Accordingly, excessive addition of the flocculant should be avoided.

Although we deem that the ratio of the anionic high molecular flocculating agent to the sludge will give a large influence upon the filtering characteristics of free water on gravitational dehydration and that it will not give a large influence upon the filtering rate (processing rate). If the ratio of added flocculant to sludge is less than an appropriate ratio, filtering fabric would be clogged due to incomplete formation of floc and deposition of unflocculated sludge on the filtering fabric on squeezing.

If flocculating agent is excessively added, the resultant floc is cohesive and excess flocculating agent will deposit upon the filtering fabric to cause the fabric to be clogged. As a result of this, washing efficiency is lowered for lowering the filtering capacity.

6) Effective squeeze dehydration conditions

In order to enhance the reduction in volume of the sludge, it is necessary to reduce the water content of the dehydrated cake. To provide a rate of reduction in volume of 50% or more when the sludge specific weight is 1.4 kg/cm$^3$, it is necessary to make water content 30%. Accordingly, it is understood from FIG. 9 that the squeeze pressure should be 2.5 kg/cm$^2$ or more.

If the dehydration period of time is extended for the same squeeze pressure, the cake water content could be reduced (refer to FIG. 10) and the filtering rate has a tendency to decrease (refer to FIG. 11). Extension of the dehydration time is not always advantageous.

The filtering rate is 2000 kg.ds/m.h or more (and 4000 kg.ds/m.h or more) for squeeze pressure of 2.5 kg/cm$^2$ when the squeeze time is 30 seconds or less (and 15 seconds) respectively. A dehydration method in which the squeeze period of time is as short as possible and the squeeze pressure is as high as possible is effective.

From the foregoing, gravitational to squeeze dehydration conditions are summarized as shown in Table 4.

TABLE 4

|  | GRAVITATIONAL DEHYDRATION | SQUEEZE DEHYDRATION | | |
| --- | --- | --- | --- | --- |
| PRESSURE (kg/m$^2$) | 0 | 0.1 TO 0.5 | 0.5 TO 1 | 1 TO 2 |
| TIME (sec) | 60 | 20 | 20 | 20 |

7) Conclusions a) In order to achieve reduction in volume of the sludge, it is necessary to make the water content of dehydrated cake about 30%. Dehydration conditions are as follows:

After free water is removed for a gravitational dehydration period of time of 60 seconds, squeeze dehydration is stepwise conducted at pressures 0.1 to 0.5 kg/cm for 20 sec, 0.5 to 1.0 kg/cm$^2$ for 20 sec., 1–2 kg/cm$^2$ for 20 sec. by means of belt dehydrating machine. Filtering rate (estimated value) is about 3 t.ds/m.h (effective belt width per hour).

b) Most effective high molecular flocculating agent for forming floc is anionic high molecular flocculating agent. Appropriate ratio of the agent to be added per suspended solid (SS) is 0.24%.

c) Sludge which is mixed with comparatively much cement grout exhibits excellent floc formation and dehydration effect when using only anionic high molecular flocculating agent. Sludge containing no cement grout, but mainly containing silt and clay exhibits poor floc formation and dehydration characteristics. The floc formation and dehydration characteristics are made remarkably high by preliminarily adding 5000 g/m$^3$ of calcium chloride which is one of the inorganic flocculating agents (at a ratio of 2.1% to SS).

As mentioned above, the specific weight of sludge is adjusted to fall within a given range and the optimum range of the amount of the flocculating agent to be added is adjusted to fall within an optimum range. Clogging of the dehydrating machine is prevented from occurring. Stable dehydrating capacity is assured for an extended period of time. Maintenance becomes easy and reduction in operating cost and increase in efficiency of working can be achieved.

What is claimed is:

1. A system for treating sludge comprising:

means for generating sludge from a ground improvement working site;

means supplying said untreated sludge to an untreated sludge container for containing sludge generated from said ground improvement working site;

means for measuring specific weight of untreated sludge in said untreated sludge container;

sludge diluting means comprising a container in which mixing of diluting water and untreated sludge supplied from said untreated sludge tank occurs;

means for supplying water for diluting the sludge;

means for admitting the sludge from said untreated sludge container and the diluting water from diluting water supplying means to dilute the sludge in said sludge diluting means and to supply said diluted sludge to dehydrating means according to the capacity thereof;

means for adding a flocculating agent to the diluted sludge supplied to said dehydrating means;

said means for mechanically dehydrating diluted sludge which has been added with the flocculating agent;

means for controlling the amount of the sludge and the diluting water to be supplied to said sludge diluting means so that the diluted sludge has a specific weight of 1.15 to 1.35; and means for controlling the amount of the flocculating agent to be added to the diluted sludge.

2. A system for treating sludge as defined in claim 1 in which said dehydrating means is selected from the group consisting of a filter press, a vacuum dehydrating machine and a belt press.

* * * * *